United States Patent

Allen et al.

[15] 3,662,587
[45] May 16, 1972

[54] THERMAL CONDUCTIVITY APPARATUS

[72] Inventors: Edwin L. Allen; Donald A. Willoughby, both of Huntsville, Ala.

[73] Assignee: The United States of America as represented by the Secretary of the Army

[22] Filed: Oct. 2, 1970

[21] Appl. No.: 77,461

[52] U.S. Cl. .................................................73/15 A
[51] Int. Cl. ..................................................G01n 25/20
[58] Field of Search.......................................73/15

[56] References Cited

UNITED STATES PATENTS

| | | | |
|---|---|---|---|
| 3,279,239 | 10/1966 | Arends et al. | 73/15 |
| 3,263,485 | 8/1966 | Mahmoodi | 73/15 |
| 3,233,458 | 2/1966 | Vrolyk | 73/190 |

OTHER PUBLICATIONS

Dynatech Corporation Publication. Received in Office March 3, 1967

Primary Examiner—Richard C. Queisser
Assistant Examiner—Herbert Goldstein
Attorney—Harry M. Saragovitz, Edward J. Kelly, Herbert Berl and Charles R. Carter

[57] ABSTRACT

An apparatus for determining the thermal conductivity of solid propellant samples. The apparatus includes a vessel having a heavy copper base plate for providing a heat source to one side of a propellant sample. The plate is connected to a thermocouple for measuring it temperature, which should be essentially identical to the temperature of the upper surface of the sample. A copper metering block is in contact with the lower surface of the sample and this block is connected to a second thermocouple for measuring its temperature, which should be essentially identical with the temperature of the lower surface of the sample. A guard block is spaced from and surrounds the metering block to prevent heat loss from the metering block.

1 Claim, 2 Drawing Figures

PATENTED MAY 16 1972 3,662,587

Edwin L. Allen
Donald A. Willoughby,
INVENTORS.

THERMAL CONDUCTIVITY APPARATUS

BACKGROUND OF THE INVENTION

This invention relates to the field of thermal conductivity testing. Previous thermal conductivity apparatus have had a problem in heat losses from the metering block.

SUMMARY OF THE INVENTION

The present invention has solved this problem by providing a guard block spaced from and surrounding the metering block to prevent the heat loss from the metering block.

This invention may be better understood from the following detailed description taken in conjunction with the accompanying drawing.

DESCRIPTION OF THE PREFERRED EMBODIMENT

Figure 1:
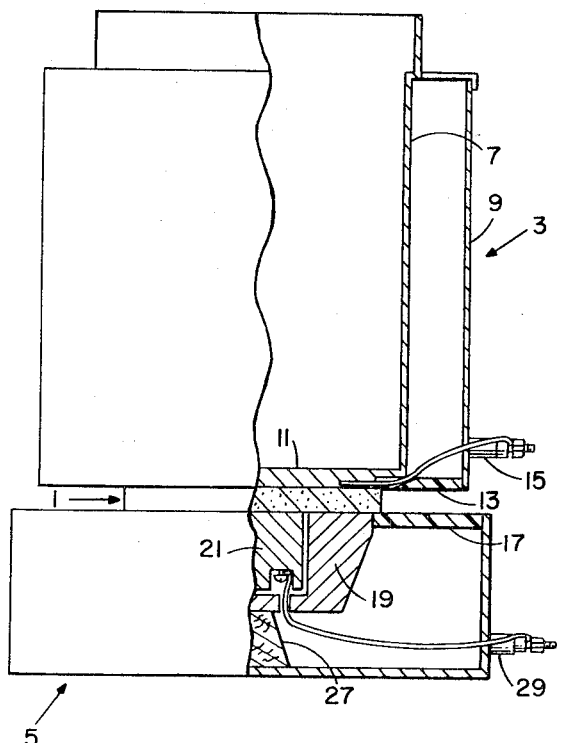
FIG. 1 is a sectional view of the apparatus.

Reference numeral 1 indicates a solid propellant sample to be tested and is located between a heat source 3 and a receiver 5. The source includes a heat vessel 7 separated from an outer liner 9 by a jacket of air, which serves as an insulation therebetween. Vessel 7 has a heavy copper base plate 11 supported on a masonite member 13 connected to liner 9. A thermocouple 15 is mounted on the wall of liner 9 and is connected to the base plate for measuring the temperature thereof, which should be essentially identical to the temperature of the upper surface of the sample. Boiling water or a crushed ice-water solution offer conveniently available steady temperatures. When vessel 7 contains boiling water an immersion heater (not shown) is used to keep the water boiling throughout the test.

Figure 2:
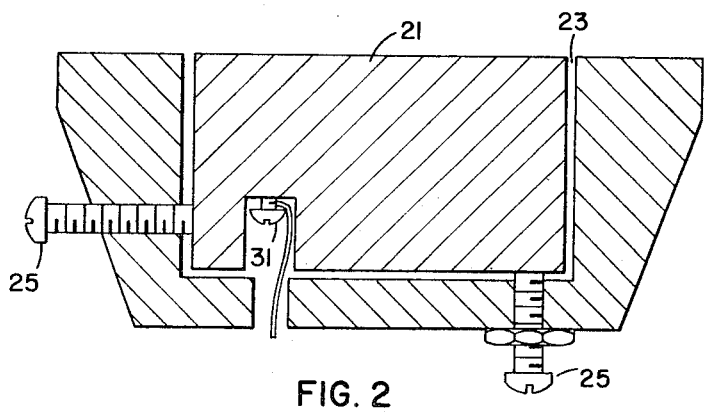
FIG. 2 is a sectional view of the guard and metering blocks.

Receiver 5 consists of a masonite upper surface 17 having an aperture therein for mounting a copper guard block 19 and a copper metering block 21. A predetermined air gap 23, more clearly shown in FIG. 2, is maintained between the metering block and its guard by nylon screws 25 around the vertical sides and the bottom face of the metering block. The base plate of vessel 7 and the top faces of the guard and metering blocks are face ground to provide smooth, flat surfaces for contact with the sample. Alignment of the faces of the guard and metering blocks is accomplished by adjusting the nylon screws. The guard block is supported on the bottom of receiver 5 by a cork member 27. A second thermocouple 29 mounted on the wall of the receiver is connected by means 31 to metering block 21 for measuring the temperature of the metering block which should be essentially identical with the temperature of the lower surface of the sample. The outside wall of the guard block is tapered so that the mass of the guard block per unit of face area is approximately equal to the mass of the metering block per unit of face area. Thus it can be seen that the guard block and metering block are at very near the same temperature throughout the test, thereby eliminating heat loss from the metering block. This concept of using a guard block is believed to be applicable to the design of heat-flux meters and to other applications.

We claim
1. An apparatus for determining the thermal conductivity of solid propellant samples comprising: a vessel and a metering block engaging opposite sides of a sample for respectively supplying heat thereto and for measuring thermal conductivity therethrough, a block disposed around said metering block and spaced therefrom to prevent heat loss from said metering block, said vessel being connected to a thermocouple for measuring the temperature conducted from said vessel to said sample, said metering block being connected to a second thermocouple for measuring the temperature of said block, said guard block spaced from said metering block by adjusting screws, said guard block having a mass per unit of face area approximately equal to the mass of the metering block per unit of face area, said block having a face parallel to said metering block and in contact with the sample, and said guard block having dimensions and properties chosen relative to the metering block so that heat flow through the sample raises the temperature of the guard block and metering block in equal amounts.

* * * * *